(12) United States Patent
Stephan

(10) Patent No.: US 6,367,275 B1
(45) Date of Patent: Apr. 9, 2002

(54) METHOD OF COOLING AIR IN THE UNDER-ROOF SPACES OF BUILDINGS

(75) Inventor: Rudolf Stephan, Wolfsburg-Ehmen (DE)

(73) Assignee: Luigi Riva, Milan (IT)

( * ) Notice: Subject to any disclaimer, the term of this patent is extended or adjusted under 35 U.S.C. 154(b) by 0 days.

(21) Appl. No.: 09/237,369

(22) Filed: Jan. 26, 1999

(30) Foreign Application Priority Data

Jan. 26, 1998 (EP) .............................................. 98830033

(51) Int. Cl.[7] .............................................. F25D 23/12
(52) U.S. Cl. .......................... 62/259.1; 62/316; 62/304; 106/290
(58) Field of Search ....................... 62/304, 316, 259.1; 106/290

(56) References Cited

U.S. PATENT DOCUMENTS

| 3,964,268 A | * | 6/1976 | DiPeri ........................... 62/304 |
| 4,025,355 A | * | 5/1977 | Mozhaev et al. ............ 106/290 |
| 4,119,476 A | * | 10/1978 | Grishin ......................... 106/87 |
| 4,761,965 A |   | 8/1988 | Viner ............................ 62/171 |
| 4,905,480 A |   | 3/1990 | Boström ....................... 62/310 |
| 4,951,480 A | * | 8/1990 | Brence ......................... 62/304 |
| 5,311,931 A | * | 5/1994 | Lee ............................... 62/304 |
| 5,329,785 A | * | 7/1994 | Sakuai et al. ................. 62/304 |
| 5,584,926 A | * | 12/1996 | Borgholm et al. ........... 106/713 |
| 5,598,719 A | * | 2/1997 | Jones et al. ................... 62/304 |

FOREIGN PATENT DOCUMENTS

| FR | 2 697 323 | 4/1994 |
| GB | 244963 | 12/1925 |

* cited by examiner

Primary Examiner—William Doerrler
Assistant Examiner—Mark Shulman
(74) Attorney, Agent, or Firm—Arent Fox Kintner Plotkin & Kahn

(57) ABSTRACT

Method of cooling air in under-roof spaces of buildings, comprising the following steps:

a) mixing water, cement, aluminium powder and a material selected from sand, gravel and the like, into a smooth mixture;

b) spreading the smooth mixture over the roof to obtain a uniform layer of porous concrete;

c) drying the layer; and d) soaking the layer with water.

16 Claims, No Drawings

METHOD OF COOLING AIR IN THE UNDER-ROOF SPACES OF BUILDINGS

FIELD OF THE INVENTION

The present invention relates to a method of cooling air in the under-roof spaces of buildings, said roof being flat and of non-insulating material.

BACKGROUND ART

In the hotter areas of our planet, especially the equatorial and tropical regions, there is a need to significantly reduce the temperature of the interior spaces of buildings to allow people to live and work there even during the hottest hours of the day.

There are many types of air conditioners that can be used for this purpose but they require large quantities of energy, usually electrical energy, to keep them running throughout the entire day.

When it is remembered also that in some parts of the world temperatures are very high all year round, it is not difficult to imagine the huge energy costs of providing air conditioning for whole buildings.

It should be emphasized, too, that the use of the above-mentioned air conditioners raises ecological problems that should not be underestimated. Using, as they do, large amounts of electrical power, they contribute, however indirectly, to a considerable production of harmful substances and significantly raise the level of carbon dioxide emissions into the atmosphere.

SUMMARY OF THE INVENTION

The problem underlying the present invention is therefore that of providing a new method that is capable of overcoming the abovementioned problems.

The problem is solved, according to the invention, by a method of cooling air in under-roof spaces of buildings, said roof being flat and of non-insulating material, the method being characterized in that it comprises the following steps:

a) mixing water, cement, aluminium powder and a material selected from sand, gravel and the like, into a smooth mixture;
   b) spreading said smooth mixture over said roof to obtain a uniform layer of porous concrete;
   c) drying said uniform layer of porous concrete; and
   d) soaking said layer with water.

DETAILED DESCRIPTION OF THE INVENTION

The method according to the present invention, as depicted in the above section "Summary Of The Invention" and as claimed in the appended claims, utilizes the principle whereby a liquid, in order to pass into the gaseous state, absorbs the necessary energy (enthalpy of evaporation) from the surface it is lying on and so cools it. If, as in this case, the surface in question is the roof of a building, this effect will be sufficient to significantly lower the temperature in the spaces underneath the roof, rendering them habitable without the need for costly air conditioning equipment.

All of this is achieved without compromising the strength of the cladding of the roof of the building, because the layer of porous concrete obtained with the method of the present invention has sufficient strength and solidity, even at thicknesses of only 3 cm, easily to carry the weight of any person who may need to climb onto the roof for maintenance purposes or for any other reason.

Using the method according to the present invention it is possible to cover non-insulating roofs (made of concrete, reinforced concrete or the like) with a uniform porous layer capable of absorbing water. In just the same way as a sponge, this porous layer can then release the water at a slow, constant pace so that the roof is cooled for a long period. In practice, the house is built as an absorption system refrigerator. The cooling is obtained thanks to the solar irradiation, that allows the water to evaporate from the wet concrete layer.

The uniform layer of concrete with which the roof is covered is made porous by an effervescent reaction generated by the presence of metallic aluminium powder in the initial mixture.

The method according to the present invention is applicable to any type of building with a flat roof of non-insulating material and can be used to cool structures used as dwellings, offices, shops, stores, hospitals, schools, hotels and the like.

The method according to the present invention lends itself particularly well to the cooling of one- or two-storey buildings. Nonetheless, it can also be applied to buildings comprising more than two storeys combining it if necessary with conventional cooling technology.

With the method according to the present invention it is possible to condition the air in the interior spaces of buildings at a low cost dictated purely by the consumption of water; this is a trifling cost when compared with the cost of employing conventional air conditioning equipment.

The use of the method according to the present invention is furthermore completely environmentally friendly: it produces no toxic substances or pollutants of any kind and cuts emissions of carbon dioxide into the atmosphere to zero.

In a particularly advantageous embodiment of the present invention, the cement and the aluminium powder are mixed together in a variable weight ratio of from 10:1 to 20:1. The roof is preferably covered with a layer of porous concrete between 3 and 6 cm thick.

The layer of porous concrete is soaked with water by periodically spraying it whenever it becomes completely dry.

In another aspect, the present invention relates to a ready-prepared mix consisting of cement and aluminium in a variable weight ratio of from 10:1 to 20:1 and to the use of this ready-prepared mix in carrying out the method described above.

In yet another aspect, the present invention relates to the use of aluminium powder for the production of porous concrete. This aluminium powder is preferably used in a variable weight ratio of from 1:10 to 1:20 relative to the cement.

In order to explain the invention more clearly a preferred embodiment thereof will now be described by way of non-restrictive example.

800 kg of Portland cement, 54 kg of aluminium powder and 7.2 t of sand were mixed with water and worked until a smooth mixture was obtained having a consistency similar to that of a conventional concrete mixture.

During mixing it was possible to observe a certain effervescence of the mixture.

The mixture was then poured onto the flat reinforced-concrete roof of a house, which consisted of a single 8×10 m storey, to form a uniform layer approximately 3.5 cm thick. Once it was completely dried, the layer of porous concrete was sprayed on two occasions, with an interval of 3 hours between the two, with 50 l of water on each occasion.

In this way it was possible, with a temperature measured on the surface of the layer of porous concrete of 60–63° C., to maintain the interior of the house at a constant temperature of 24–26° C.

To achieve this result with conventional cooling systems it would have been necessary to deploy four electrical cooling systems, each consuming 3 kWh; these electrical systems would have had to remain active for six hours a day.

There follows a simple calculation which demonstrates the remarkable savings achievable with the method according to the invention for cooling the interiors of buildings when compared with ordinary electrical air conditioning systems.

| Annual cost of cooling using conventional technologies: | |
|---|---|
| Annual electricity consumption: | |
| 3 kW × 6 hours × 4 systems × 365 days = 26 280 kW | |
| Cost of one kW: | 0.20 DM |
| TOTAL | 5256.00 DM |
| Annual cost of cooling using the method of the present invention: | |
| Annual water consumption: 0.1 m³ × 365 days = 36.5 m³ | |
| Cost of 1 m³ of water: | 2.00 DM |
| TOTAL | 73.00 DM |

As is clear from the above figures, the costs related to the use of the method according to the invention are around one seventieth of the costs related to the use of a conventional air conditioning system and this result is achieved in a totally environmentally friendly way, with no emissions into the atmosphere of toxic substances or pollutants and with zero carbon dioxide emissions.

What is claimed is:

1. Method of cooling air in under-roof spaces of buildings, said roof being of non-insulating material, the method being characterized in that it comprises the following steps:
    a) mixing water, cement, aluminium powder and a material selected from sand, gravel and the like, into a smooth mixture;
    b) spreading said smooth mixture over said roof to obtain a uniform layer of porous concrete;
    c) drying said layer; and
    d) soaking said uniform layer of porous concrete with water.

2. Method according to claim 1, in which said cement and said aluminium powder are mixed together in a variable weight ratio of from 10:1 to 20:1.

3. Method according to claim 1, in which said uniform layer of porous concrete is between 3 and 6 cm thick.

4. Method according to claim 2, in which said uniform layer of porous concrete is between 3 and 6 cm thick.

5. Method according to claim 1, in which said soaking takes place at predetermined intervals by spraying.

6. Method according to claim 2, in which said soaking takes place at predetermined intervals by spraying.

7. Method according to claim 3, in which said soaking takes place at predetermined intervals by spraying.

8. Method according to claim 4, in which said soaking takes place at predetermined intervals by spraying.

9. A ready-prepared composition consisting of cement and aluminum mixed together in a variable weight ratio of from 10:1 to 20:1.

10. A method of cooling air in a space under a roof of a building, said roof of a non-insulating material, the method comprises the following steps:
    a) mixing water, a ready-prepared composition consisting of cement and aluminum mixed together in a variable weight ratio of from 10:1 to 20:1 and a material selected from sand, gravel and the like, to obtain a smooth mixture;
    b) spreading said smooth mixture over said roof to obtain a uniform layer of porous concrete;
    c) drying said layer of porous concrete to obtain a uniform layer of porous concrete; and
    d) soaking said uniform layer of porous concrete with water.

11. The method of claim 10, wherein said uniform layer of porous concrete is between 3 and 6 cm thick.

12. The method of claim 10, wherein said soaking takes place at predetermined intervals by spraying.

13. The method of claim 11, wherein said soaking takes place at predetermined intervals by spraying.

14. The method according to claim 1, wherein said roof is flat.

15. The method according to claim 10, wherein said roof is flat.

16. A method of cooling air in a space under a roof of a building, said roof of a non-insulating material, the method comprises the following steps:
    a) mixing water, a ready-prepared composition consisting of cement and aluminum mixed together in a variable weight ratio of from 10:1 to 20:1 and a material selected from sand and gravel, to obtain a smooth mixture;
    b) spreading said smooth mixture over said roof to obtain a uniform layer of porous concrete;
    c) drying said layer of porous concrete to obtain a uniform layer of porous concrete; and
    d) soaking said uniform layer of porous concrete with water.

* * * * *